United States Patent [19]

Mrcun

[11] 4,041,340
[45] Aug. 9, 1977

[54] BRUSHLESS ALTERNATOR

[76] Inventor: Ivan Mrcun, Kajuhova 4, Domzale, Yugoslavia, 61230

[21] Appl. No.: 624,933

[22] Filed: Oct. 22, 1975

[30] Foreign Application Priority Data

Oct. 22, 1974 Yugoslavia .................. 2819/74
Oct. 22, 1974 Yugoslavia .................. 2820/74

[51] Int. Cl.² ................................ H02K 1/22
[52] U.S. Cl. ............................ 310/263; 310/67 R
[58] Field of Search ............... 310/67, 263, 257, 266, 310/49

[56] References Cited

U.S. PATENT DOCUMENTS

| 3,206,623 | 9/1965 | Snowdon | 310/263 |
| 3,466,476 | 9/1969 | Snowdon | 310/67 |
| 3,517,504 | 6/1970 | Sakamoto | 310/263 |
| 3,535,566 | 10/1970 | Smith | 310/266 |
| 3,610,979 | 10/1971 | Thomas | 310/263 |
| 3,783,313 | 1/1974 | Mathur | 310/67 |

FOREIGN PATENT DOCUMENTS 158,333  10/1963  U.S.S.R. .................. 310/263

Primary Examiner—R. Skudy
Attorney, Agent, or Firm—Karl F. Ross; Herbert Dubno

[57] ABSTRACT

An electrical machine, especially an alternator, has a housing axially split into two generally symmetrical halves in which a rotor shaft is journaled. Held between the two housing halves are radial extensions of stator teeth which are bracketed by two relatively offset sets of rotor poles mounted on the shaft, the teeth being interconnected within the rotor by an annular magnetic yoke. A stationary excitation coil, surrounding a split inner hub of the rotor body, is carried by the yoke to generate a flux magnetizing the poles. The teeth have wings closely spaced from the orbital paths of the poles and also have webs, about half as wide as their wing span, enveloped by armature windings in which the output voltage of the alternator is induced upon a turning of the rotor.

10 Claims, 8 Drawing Figures

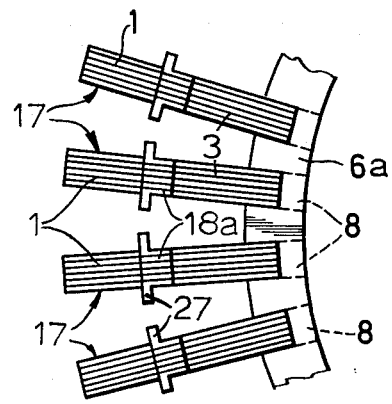
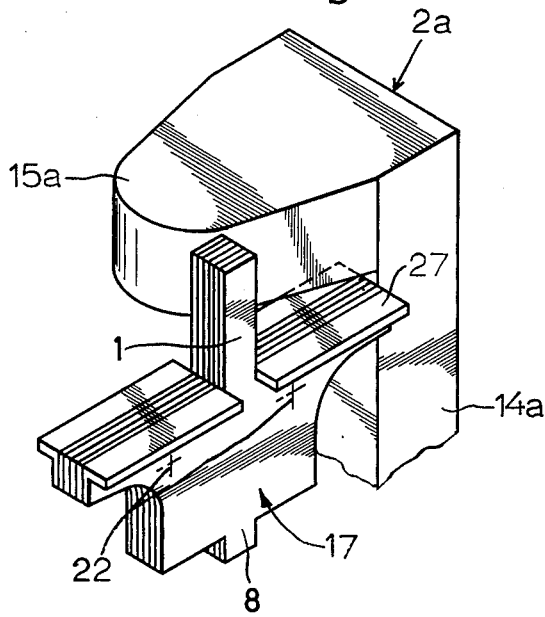
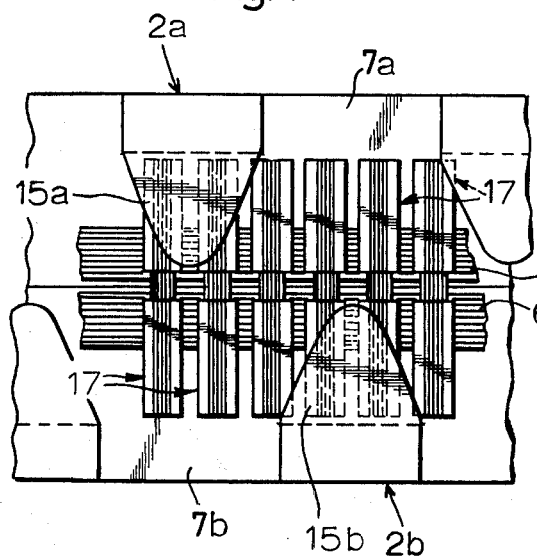
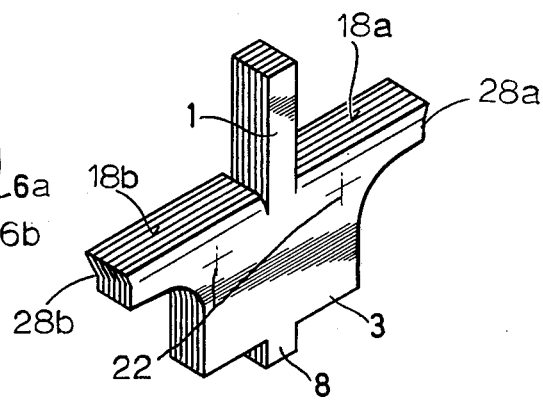

BRUSHLESS ALTERNATOR

FIELD OF THE INVENTION

The present invention relates to an electrical machine, more particularly an alternator of the brushless type.

BACKGROUND OF THE INVENTION

Conventional alternators, in which slip rings and contact brushes are used to deliver the generated output voltage from a rotating armature winding to a load or to energize an excitation coil of a rotating electromagnet, are subject to various disadvantages such as noise, sensitivity to dust and oxidizing atmospheric conditions, and sparking which makes such machines unsuitable for use in explosive atmospheres. The same drawbacks exist in electric motors provided with such slip rings and brushes.

OBJECTS OF THE INVENTION

The general object of my present invention, therefore, is to provide an improved electrical machine of the brushless type which is of simple construction and obviates the aforestated disadvantages.

A more particular object is to provide an alternator, of either the single-phase or the three-phase type, having a higher power output than conventional alternators of comparable weight and dimensions.

SUMMARY OF THE INVENTION

An electrical machine according to my present invention comprises a magnetically permeable rotor on a shaft which is journaled in a housing with a generally cylindrical peripheral wall centered on the shaft axis, this rotor including a magnetized central hub whose extremities are rigid with two axially spaced annular arrays of pole pieces; the pole pieces of one array are peripherally offset from the oppositely polarized pole pieces or the other array. A magnetically permeable stator rigid with the housing includes a set of peripherally spaced teeth which project radially inwardly from the peripheral housing wall between the arrays of pole pieces and carry armature windings for electromagnetic interaction with these pole pieces, the teeth being mechanically and magnetically interconnected by an annular yoke centered on the housing axis. Unless the hub is formed in whole or in part by a permanent magnet, its magnetization is maintained by a stationary excitation coil concentrically surrounding it with intervening spacing, that coil being supported on the stator.

In an advantageous embodiment, the housing and the rotor are split into two halves along a transverse midplane which bisects an annular gap formed between the two arrays of pole pieces, the stator teeth being held in position by extensions thereof clamped between the two housing halves. The two sets of pole pieces extend from opposite sides toward this midplane so as to form an annular space between themselves and the hub, this space preferably accommodating not only the excitation coil but also major portions of the teeth. This nesting of major tooth portions of the stator within the rotor affords a particularly compact construction. An alternative arrangement, in which only the excitation coil lies in that space and is held by extensions of the stator teeth positioned for the most part outside the rotor, is described and illustrated in my copending application Ser. No. 624,934 of even date whose disclosure is incorporated by reference in the present application. The hub could also be divided into more than two parts as likewise shown in that copending application.

The major tooth portions bracketed by the pole pieces of the rotor advantageously include each a radially extending web surrounded by the associated armature winding and a pair of wings extending laterally from this web adjacent the pole pieces, a preferred wing span being about twice the width of the web as measured in the axial direction. The spacing of the teeth with reference to that of the pole pieces and the electrical interconnection of the armature depends, of course, on the desired type of output voltage (e.g. single-phase or three-phase) as is well known per se.

Although reference will be made only to an alternator in the following description, it will be apparent that an analogous construction may be adopted for an electric motor.

BRIEF DESCRIPTION OF THE DRAWING

The above and other features of my invention will now be described in detail in reference to the accompanying drawing in which:

FIG. 2 is a fragmentary side view of a stator, with windings removed, forming part of the machine shown in FIG. 1;

FIG. 3 is a fragmentary axonometric view of a stator tooth and a rotor pole piece included in the alternator of FIG. 1;

FIG. 4 is a fragmentary developed view of the rotor and the stator of the alternator of FIG. 1;

FIG. 5 is a view similar to FIG. 3, showing a modified tooth;

SPECIFIC DESCRIPTION

Figure 1:
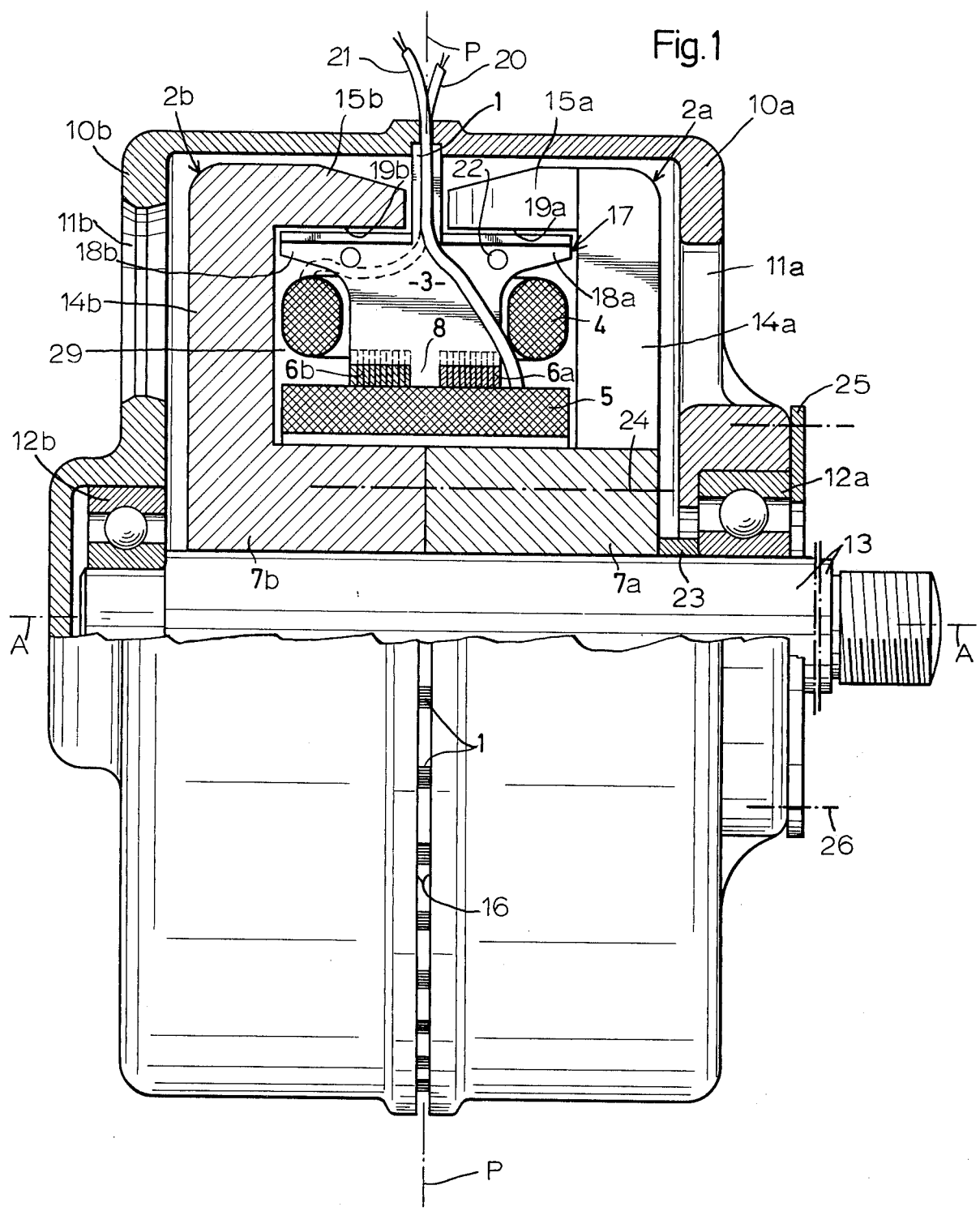
FIG. 1 is an elevational view, partly in axial section, of an alternator embodying my invention.

In FIG. 1 I have shown an alternator, i.e. an electrical machine for the generation of an alternating voltage, comprising a substantially cylindrical housing split into two generally mirror-symmetrical halves 10a, 10b formed with venting apertures 11a, 11b. Journaled in this housing, by means of ball bearings 12a, 12b, is a rotor shaft 13 with a threaded end adapted to receive a nonillustrated pulley driven from an external prime mover. The shaft may also carry a fan for blowing cooling air through the apertures 11a and 11b as illustrated in my above-identified copending application.

Shaft 13 carries a rotor split into two substantially identical but relatively offset halves, comprising a hub 7a, 7b whose extremities are integral with radially extending arms 14a, 14b of generally L-shaped pole pieces 2a, 2b having axially disposed cheeks 15a, 15b which terminate short of a transverse midplane P, as do the two housing halves 10a and 10b. Seated within a gap 16 between these housing halves, and fastened thereto by soldering or other suitable means, are radially outwardly extending stems 1 of a set of generally T-shaped teeth 17 which pass between the two peripheral arrays of pole pieces 2a and 2b into an annular space 29 defined by the pole pieces and the hub, the cross-bar of the "T" having the shape of a web 3 of substantially greater width than the stem 1 as measured in the direction of a central axis A. Laterally extending wings 18a, 18b integral with web 3 have a span substantially twice the axial width of the web. The outer edges of these wings pass close to the inner edges of pole pieces 2a and 2b, paralleling the axially extending faces 19a, 19b of their cheeks 15a, 15b which are either flat or cylindrically curved about axis A and which are advantageously bounded by a parabolical outline, as seen in FIGS. 3 and 4, designed to induce a substantially sinusoidal voltage in armature windings 4 surrounding the webs 3 of the teeth 17. The inner edges of these webs are fitted into axially extending slots of a pair of axially spaced rings 6a, 6b forming a stator yoke, the teeth 17 also having radially inward extensions 8 sandwiched between these rings (see also FIG. 2). The yoke 6a, 6b supports an excitation coil 5 which spacedly surrounds the hub 7a, 7b and is conventionally energized via a nonillustrated rectifier from the output voltage of windings 4; these windings are bracketed by the yoke and the wings 18a, 18b. Leads (not shown) from the stationary windings 4 and 5 pass outwardly through the gap 16 to a nonillustrated load and the aforementioned rectifier.

All the rotor and stator parts 2a, 2b, 7a, 7b, 6a, 6b and 17 are made of magnetically permeable material whereby the flux induced by the winding 5 in hub 7a, 7b can readily pass through, say, pole pieces 2a into the wings 18a of teeth 17 while moving past them, thence through the webs 3 of these teeth and the yoke 6a, 6b into the webs of other teeth whose wings 18b then confront pole pieces 2b, and back to the hub in a magnetic circuit with narrow air gaps of large width resulting in a low flux density.

The stator parts are laminated as shown, with the laminations of teeth 17 lying in planes parallel to axis A and the laminations of yoke 6a, 6b extending perpendicularly thereto. The laminations of the teeth are interconnected by spot welding, preferably under a protective argon atmosphere, as indicated at 22; similar welds, not shown, serve to hold the laminations of the yoke together. Riveting could be used instead of spot-welding.

Particularly in larger machines, it may be advantageous to insert insulating layers between the teeth and the yoke to provent the flow of eddy currents.

In assembling the alternator of FIG. 1, rotor half 2b, 7b is press-fitted onto shaft 13 with housing half 10a separated from half 10b. Next, the stator is secured to housing half 10b together with coils 4 and 5 whereupon rotor half 7a, 2a is positioned on shaft 13 with insertion of a spacer ring 23 between the rotor and bearing 12a. Screws diagrammatically illustrated at 24 hold the rotor together as housing half 10a is emplaced and secured to the stator. An end disk 25 is bolted onto housing half 10a as indicated at 26 to hold the bearing 12a in place.

As illustrated in FIGS. 2 - 4, the teeth 17 may be provided with peripherally extending ledges 27 designed to enlarge their surfaces which confront the cheeks 15a, 15b of pole pieces 2a, 2b. FIG. 4 also shows that the arrays of pole pieces 2a and 2 b are peripherally offset from each other.

FIG. 5 shows a slightly modified tooth whose wings 18a, 18b lack the ledges 27 but are chamfered at their ends as indicated at 28a, 28b. This measure also increases, albeit to a smaller extent, the surface area confronting the pole pieces as compared with the average width of the tooth. Naturally, the two measures shown in FIGS. 3 and 5 can be combined.

Figure 6:
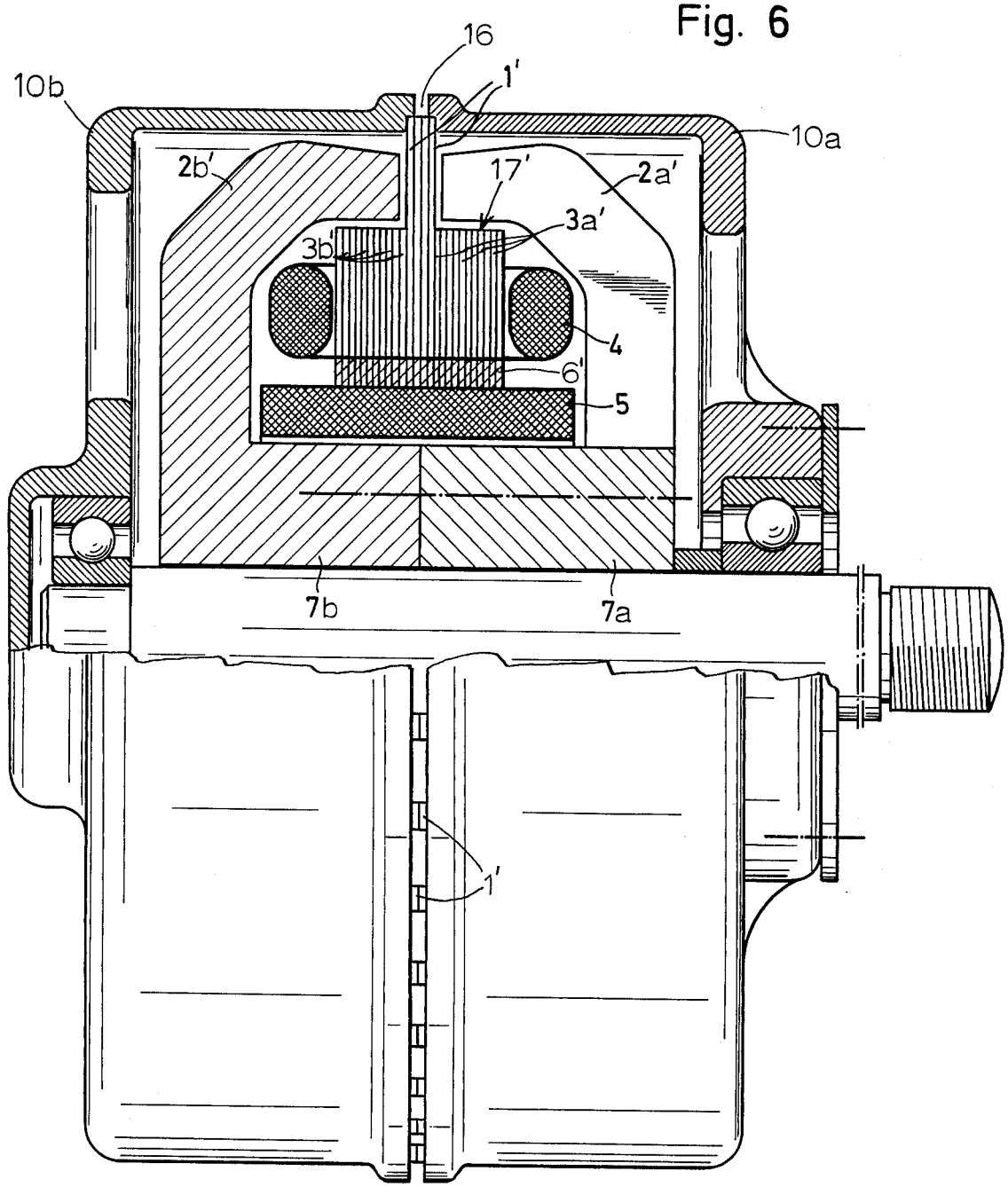
FIG. 6 is a view similar to FIG. 1, illustrating another embodiment of my invention.
Figure 7:
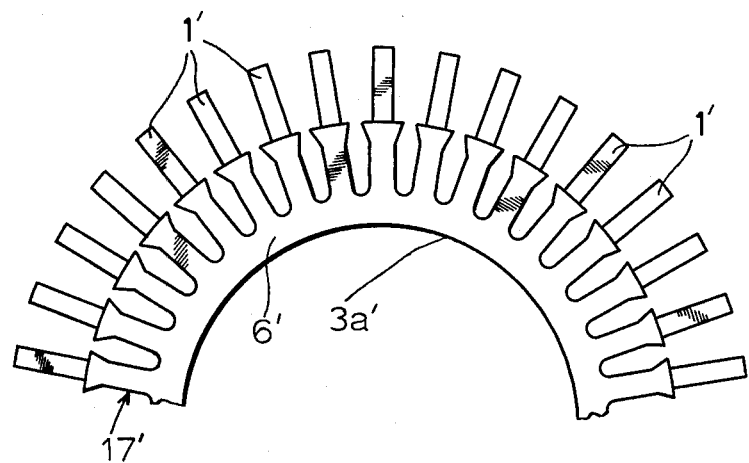
FIG. 7 is a fragmentary side view of a stator forming part of the alternator of FIG. 6.

In FIG. 6 I have illustrated, in a machine otherwise similar to that of FIG. 1, a modified rotor and stator. The rotor teeth 17', integral with a yoke 6', are again generally T-shaped and are each divided into a laminated central section 1', forming the stem of the "T", and a pair of laminated lateral sections 3a' and 3b' flanking the section 1'. As shown in FIG. 7, the lateral laminations are identical with the central laminations except for the radially outward stem-forming extensions of the latter which are held between the housing halves 10a and 10b in gap 16. These laminations, all of which lie in planes perpendicular to the housing axis, are again held together by spot-welding or possibly by riveting. The pole pieces 2a', 2b' of the modified rotor are divided into three parts adjoining one another at angles of approximately 45°. The arrangement shown in FIG. 6 is as compact as that of FIG. 1 but the effective confronting surface areas of the teeth and the pole pieces are somewhat reduced.

Figure 8:
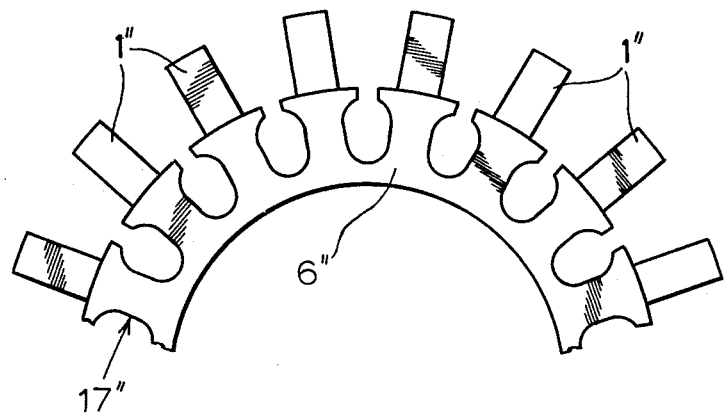
FIG. 8 is a view similar to FIG. 7, illustrating a modification.

As will be apparent from FIG. 4, the peripheral pitch of teeth 17 is one-third that of the relatively staggered pole pieces 2a and 2b. This is consistent with a three-phase alternator and also applies to the stator construction of FIG. 7. In FIG. 8 I have shown a similar stator construction with teeth 17" having radial extensions 1" and an annular yoke 6" whose laminations are again integral of those of the teeth, the pitch of these teeth being three times that of the teeth 17' in FIG. 7 and corresponding therefore to that of the pole pieces. With this modification, a single-phase output voltage is obtained.

I claim:

1. In an electrical machine comprising two relatively rotatable members centered on a common axis, one of said members having a magnetically permeable body which includes a magnetized hub and two axially spaced annular arrays of pole pieces rigid with opposite extremities of said hub, the other of said members including a set of peripherally spaced teeth interconnected by an annular yoke and positioned for magnetic interaction with said pole pieces, said yoke and said teeth being magnetically permeable, and armature windings surrounding said teeth, the pole pieces of one array having substantially axially extending faces on one side of a transverse midplane and being peripherally offset from the oppositely polarized pole pieces of the other array, the latter having substantially axially extending faces on the other side of said midplane, the improvement wherein said hub and said pole pieces together define an annular space surrounding said hub, said annular space being bounded in part by said axially extending faces, said teeth having major portions interconnected by said yoke in said annular space and surrounded by said armature windings.

2. The improvement defined in claim 1 wherein said one of said members is a rotor and said other of said members is a stator including a stationary housing having a generally cylindrical wall centered on said rotor, said teeth being provided with stems projecting radially inwardly from said wall into said annular space.

3. The improvement defined in claim 2 wherein said major portions include each a radially extending web substantially wider than said stems and a pair of wings extending laterally from said web adjacent said pole pieces.

4. The improvement defined in claim 3 wherein said armature windings surround the webs of said teeth, said wings having a span in axial direction approximately twice the axial width of said web.

5. The improvement defined in claim 3 wherein said yoke comprises two axially spaced rings with axially notched outer peripheries partly receiving the webs of said teeth, said webs being provided with inward projections disposed between said rings.

6. The improvement defined in claim 5 wherein said teeth are composed of laminations parallel to said axis, said rings consisting of laminations transverse to said axis.

7. The improvement defined in claim 2 wherein said teeth are divided into a central section extending from said annular space to said wall and a pair of lateral sections entirely within said annular space flanking said central section, said yoke being divided into central and lateral rings respectively integral with said central and lateral sections, said armature windings embracing all said sections.

8. The improvement defined in claim 7 wherein said sections and said rings consist of laminations transverse to said axis.

9. The improvement defined in claim 2 wherein said housing and said rotor are split into two halves along said transverse midplane, said stems being held between the halves of said housing.

10. The improvement defined in claim 2, further comprising an extension coil centered on said axis and spacedly surrounding said hub for maintaining the magnetization thereof, said coil being supported in said annular space by said yoke.

* * * * *